Dec. 3, 1935.   R. P. MOYER ET AL   2,022,731
LIQUID RECTIFYING METHOD AND APPARATUS
Filed April 11, 1933

Inventors,
R. P. Moyer
F. H. Moyer,
By Robert M. Pierson,
Attorney

Patented Dec. 3, 1935

2,022,731

UNITED STATES PATENT OFFICE 2,022,731

LIQUID RECTIFYING METHOD AND APPARATUS

Robert P. Moyer and Fredellia Hughes Moyer, Pittsburgh, Pa.

Application April 11, 1933, Serial No. 665,514

9 Claims. (Cl. 196—16)

This invention relates to the treatment of liquids for the purpose of purifying or rectifying the same by separation of polluting or contaminating matter. Its object is to provide an improved method and apparatus for accomplishing that and incidental purposes.

An important application of the invention lies in the purification or reclaiming of lubricating oil whose use on motor-car engines or other machinery has polluted it with solids such as carbon, particles of bearing metal and road dust, and with liquids such as water of condensation, gasoline or other fuel residues added by leakage past the pistons, or undistilled fuel oil which the lubricating oil may originally have contained.

Such contaminated oils, by filtering out the solids and boiling out the volatile liquids, can be made to yield nearly an equal volume of reclaimed product having lubricating properties as good as those of the original or even better because of removal of some of the volatile constituents and residual carbon originally contained; but prior methods and apparatus have been slow and expensive. The present invention achieves new and better results in the way of savings in time, labor, cost of apparatus and quality of product.

Figure 1:
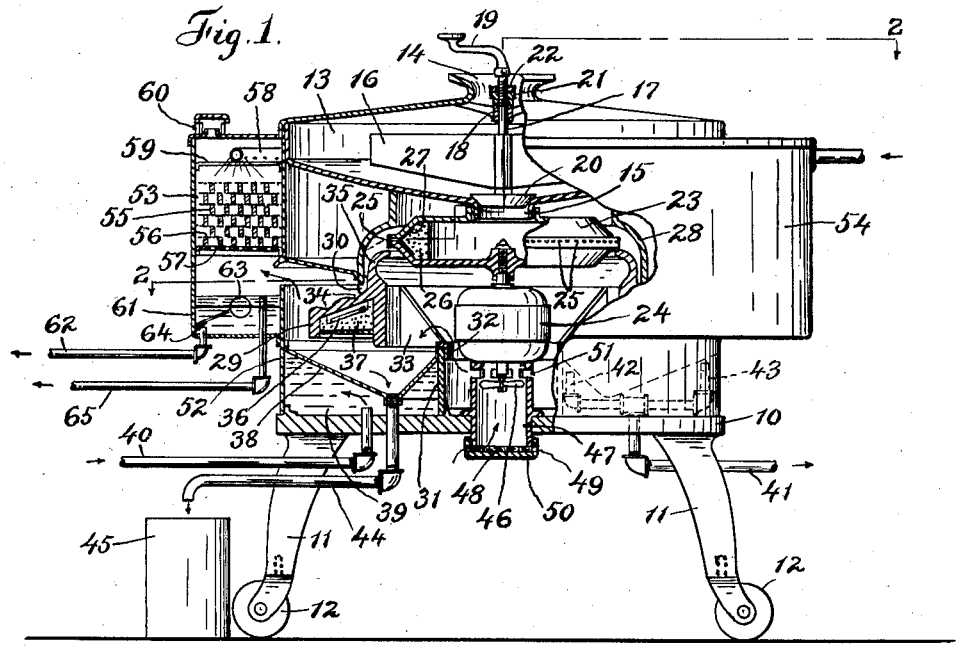

Of the accompanying drawing, Fig. 1 is a vertical section, partly in elevation, showing an apparatus embodying and adapted to carry out our invention.

Figure 2:
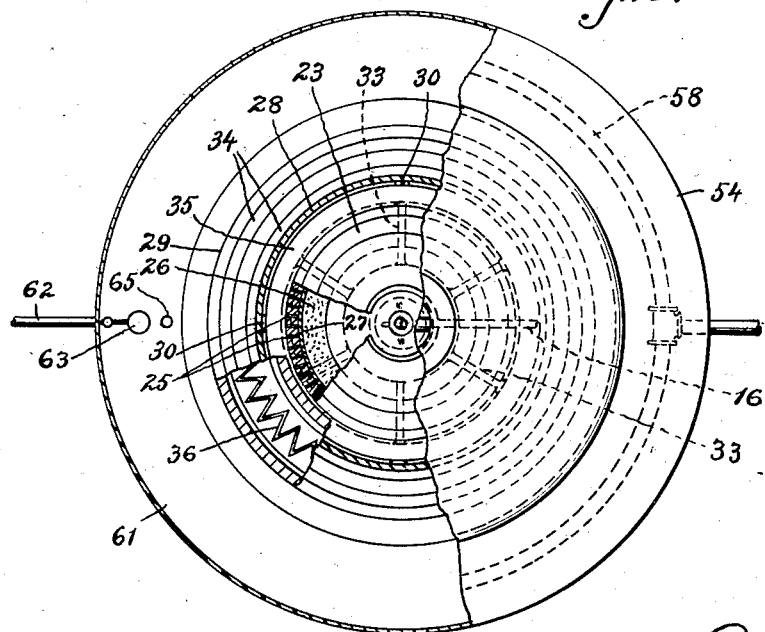

Fig. 2 is a horizontal section taken approximately on the line 2—2 of Fig. 1.

While the present invention applies generally to the purification of polluted liquids of relatively high viscosity or to the separation into its constituents of a mixture of liquids of different gravities or viscosities and to the removal of solids, vaporization of lighter liquid ingredients and recovery of solvents, it will be described in connection with polluted lubricating oil and particularly oils of petroleum origin. As thus applied an important feature of the invention consists in thinning the polluted oil, as by means of a solvent lighter oil or spirit such as petroleum naphtha, carbon tetrachloride etc., to reduce the viscosity of the mixture to a point where it can be centrifugally filtered through a clay such as fuller's earth or plaster or other suitable medium. In a preferred procedure, the filtrate is then collected and passed in a film by gravity over an inclined, heated vaporizing surface, the rectified lubricating oil is cooled and drawn off for further use, the volatile vapors are condensed and the solvent oil is separated from the water and recovered for reuse. Some oils which have a high viscosity when cold can, by preheating them, be sufficiently thinned for centrifugal filtering without a solvent or with one of a comparatively high boiling point.

In the drawing, there is represented a portable restifying apparatus including a base 10 having legs 11 mounted on caster wheels 12 and supporting the several working elements.

At the top is a shallow, circular tank 13 for receiving the polluted lubricating oil and the lighter solvent oil or naphtha with which it is mixed to reduce its viscosity to a point suitable for centrifuging. This tank has a central filling opening 14 in its top wall and a central discharge opening 15 in its bottom wall leading to the centrifuge. It is shown as containing a paddle 16 mounted on a vertical shaft 17 having a bearing 18 and adapted to be rotated manually or otherwise, as by a crank-handle 19 on the upper end of the said shaft. In some cases the paddle 16 may be omitted and mixing of the oil and solvent performed in other ways, as by pouring them together into the tank or directly into the centrifuge whose rapid rotation will promote the mixing.

In the arrangement illustrated, there is included a valve 20 carried by the lower end of the paddle shaft for opening the outlet 15 by raising the shaft to admit the mixture from the tank to the centrifuge and closing said outlet when the centrifugal rotor has received a sufficient charge. If desired, the valve 20 may be adjusted to a fixed opening by the manipulation of a nut 21 which screws on a threaded portion of the paddle shaft 17, abuts against the bearing 18 and is locked by a check-nut 22, so that the mixture may be fed into the centrifugal rotor as fast as the filtrate is discharged therefrom.

23 is the rotor of the centrifuge, attached to the vertical shaft of a motor 24, such as an electric motor. Said rotor is a shallow, hollow vessel or pan made in upper and lower members joined at their edges, one of said members being peripherally drilled with a large number of small-size discharge holes 25. The upper member has an inlet opening through an upwardly-projecting flange which telescopically surrounds the downwardly-projecting flange containing the tank discharge opening 15.

The principal filtering medium contained within the rotor 23 may be a marginal, annular, porous body 26 centrifugally or otherwise cast within its interior and leaving an open central space, the dimension of whose outer diameter is several times that of its depth, for receiving the mixture to be filtered. This body may be of clay such as fuller's earth, or other material acting mechanically as well as by adsorption, which has a well-known filtering and bleaching effect upon oil passed therethrough and which has the property of neutralizing traces of sulphuric or other acid contained in the oil. Between the clay body 26 and the inner ends of the discharge holes 25 is interposed a filtering layer 27 of fibrous material such as blotting paper, to prevent loss of the clay.

Specifically, the described centrifuge is a nebulizer employing an annular porous dam of powdered material whose efficient penetration by the oil mixture requires the exertion of a strong centrifugal force causing the filtered liquid to emerge as a mist of very fine particles having the greatest possible aggregate vaporizing surface, and discharging that mist in a thin flat sheet which further promotes rapid vaporization. The action thus differs from that of basket-type filtering centrifuges which discharge the liquid in a thick shower of comparatively large drops requiring prolonged heating of the discharge or spreading it over heating surfaces of large area for properly vaporizing any volatile constituents.

Surrounding the periphery of the rotor 23 is an annular, downwardly-curved baffle 28 for collecting the sprayed filtrate and directing it upon the vaporizer 29, upon which the lower edge of said baffle is supported by a series of spacer lugs 30 formed on the baffle. The vaporizer 29 is electrically heated as hereinafter described, and the baffle 28 is heated by radiation from the vaporizer, so that the baffle surface assists in vaporizing the solvent from the atomized mixture sprayed thereon by the centrifugal rotor 23, both by artificial heat and mechanical or scrubbing action. A cylindrical flange formed on the upper edge of the baffle 28 contacts with the bottom wall of the tank 13 to support said tank. The vaporizer 29 is supported from below by a vertical cylindrical sleeve 31 resting on the base 10 and engaging a ring 32 centrally carried at the inner ends of radial arms or webs 33 projecting inwardly from the central cylindrical body flange of the vaporizer.

The upper surface of the vaporizer 29 is downwardly-slanted in cone or conoidal formation and provided with riffles forming annular grooves 34 for retarding the descent of the filtrate film and promoting its vaporization. An inwardly-curving annular flange or lip 35 projects upwardly from the vaporizer 29 to a point just below the rim of rotor 23 to form the inner wall of an annular passage through which the filtrate is discharged onto the cone surface of the vaporizer.

Any suitable means may be provided for heating the vaporizer 29, preferably in the form of an electric heating element diagrammatically indicated at 36 and supported in heating relation to the cone surface, below the latter, upon an insulating refractory body 37 such as asbestos. This element is included with a source of current supply in an electric circuit provided with any suitable thermostatic means (not herein illustrated) for regulating the current to maintain the temperature of the vaporizer at a substantially constant point, such as about 600 degrees F., which will vaporize the volatile liquids contained in the filtrate but will not decompose the lubricating oil. The maximum vaporizing temperature to be used depends somewhat on factors such as the initial temperature of the liquid being treated, the readiness of release of the lighter from the heavier constituents, the highest boiling point of the naphtha or other diluent employed, the effective area of the vaporizing surface, the volume and speed of the liquid traveling thereover etc.

Located below the vaporizer 29, in position to receive the purified oil filtrate therefrom, is an annular collecting vessel or pan 38 of V-section having a cooling chamber 39 on its under side, which receives cooling water from a supply pipe 40 and discharges it through an outflow pipe 41 having intake branches 42, 43 substantially at the highest points of the cooling chamber to avoid air pockets. From the lowest point of the collecting pan 38 leads an offtake pipe 44 under whose discharge end may be placed a can 45 for receiving the purified and cooled lubricating oil.

Provision is made for carrying off to a condenser the vapors released on the vaporizer 29, primarily by the impulse of the centrifuge supplying said vapors in the mist which it discharges and causing them to fill the posterior open spaces, and secondarily by means of a mild air current which may be produced by the motor 24, as for example by the internal ventilating fan ordinarily supplied in the armature of an alternating-current motor or by means of a separate fan 46 shown on the lower end of the motor shaft and placed in an air passage formed by a vertical pipe or casing 47 which supports the motor. The inlet to this pipe is through a felt air strainer 48 and apertures 49 in a screw-cap 50 on the lower end of the pipe, and the resistance to the air flow may be regulated by adjusting said cap. The outlet from the pipe 47 is by way of ports 51 therein above the fan, the air current passing from these ports upwardly around the motor 24, then laterally over the collector pan 38 to shield the cooled oil therein from substantial contact with the vapors, upwardly around the vaporizer 29 to a zone above said vaporizer where the air current collects the vapors therefrom, and then outwardly over the edge of a cylindrical member 52 whose lower portion forms the outer wall of the cooling chamber 39 and whose upper portion forms the inner wall of a separating chamber, to be described.

The mixture of air and vapors is then carried upwardly into a condenser 53 located in a vessel 54 which surrounds the tank 13 and parts located below the latter. This condenser is preferably of the liquid-contact type wherein the vapors are brought into contact with cooling water sprayed over a large surface provided with layers 55 of spaced blocks or other suitable forms which are separated by horizontal screens 56 and the assemblage supported on a horizontal perforated plate 57, the cooling water being supplied over the collection of blocks and screens through a spray pipe 58 supported on radial rods 59 and the air passing off from this condenser through a vent outlet 60. It will be understood that this condenser may have any other suitable form and location than the one illustrated and it is not restricted to a location surrounding the tank 13 or with its bottom below the level of said tank. In the condenser, the vapors of the solvent, as well as any particles of heavy oil and solvent mist which may have escaped the vaporizer are liquefied or thrown down by the condenser water.

The reflux water and solvent oil of condensation, together with the cooling water, discharged from the lower side of the condenser 53, are collected in an annular trap or separating vessel 61 whose bottom is formed by that of the vessel 54, its outer wall formed by the outer wall of the latter, and its inner wall formed by the member 52. In this vessel 61, the water separates by gravity from the light oil or oils, the water may be trapped off through a pipe 62 whose inlet is controlled by a float 63 and valve 64, and the oil which rises to the top of the water may be decanted through an overflow pipe 65 and collected for reuse as a solvent to be mixed with polluted oil and again run through the apparatus. Since the vapors of gasoline, naphtha and other commercial oil solvents, even when carrying considerable distillation heat, are heavier than air, although their lighter constituents will more or less diffuse and gasify in air, some of them would sink and condense on the surface of the oil in the cooler 38 and objectionably dilute the purified oil were it not for the mild current of air from the fan which is passed over the oil surface in the cooler. Therefore, it will be understood that the principal function of the air current is to keep the vapor away from the cooled oil surface and that any other suitable expedient could be employed to this end, since the vapors, under the powerful impulse of the centrifuge, aided by the partial vacuum established in the condenser 53, would in any event fill the open spaces posterior to the centrifuge and reach the condenser.

In the operation of the described embodiment of our invention, a mixture is formed of the polluted lubricating oil to be treated, with solvent naptha or the like, in the proportion of about one to two volumes of solvent to three volumes of the polluted oil. The proportion of diluent depends somewhat upon the viscosity of the oil and the peripheral speed of the centrifuge and is subject to rather wide variation, but the smaller the relative quantity, the less the amount of heat energy will be required to vaporize it and the less the amount of condensing water will be needed for its recovery. This mixture is stirred by the paddle 16 in the tank 13 and released therefrom in suitable quantity under control of the valve 20 through the outlet 15 into the chamber of the rotor 23. The latter having been set in rapid rotation by the motor 24, the mixture is centrifugally filtered through the ring 26 of filtering medium such as fuller's earth, discharged as an annular spray through the holes 25, collected and retarded by the deflecting baffle 28 and thereby led onto the conical upper surface of the electrically-heated vaporizer 29, where it forms a film whose descent is retarded by the riffles and from which the volatile liquids can be readily driven off by heat. The naphtha or other volatile diluent is partially vaporized in the spray discharge by natural heat plus the artificial heat from the motor 24 and the vaporizer 29. The heat from said vaporizer also vaporizes from the film the water which may be mixed with the oil, together with the entrained residue of solvent lighter oil or oils without substantially vaporizing the heavier lubricating oil, the purified lubricating oil running down off the vaporizer is collected and cooled in the pan 38, discharged therefrom through the pipe 44 and collected in the can 45 for further use as a lubricant. The steam and oil vapors are together carried upwardly from the vaporizer with the assistance of the air current supplied by the fan 46, condensed in the condenser 53, the condensate collected in the vessel 61, the oil and water separated by gravity in the latter, the water discharged to waste through the pipe 62 and the recovered solvent discharged for further use through the pipe 65. In this way the polluted oil is rapidly purified or rectified in a continuous process, with but little expenditure of energy and in a comparatively inexpensive apparatus which is easy to operate. When filtered solids have accumulated in the rotor 23 to an objectionable extent, said rotor may be quickly removed after lifting off the tank 13 and the baffle 28, cleaned out and its filtering materials 26 and 27 renewed if necessary. Essentially the same procedure and apparatus may be employed in whole or in part for the treatment of liquids other than lubricating oil, which would be benefitted thereby.

It will be understood that various modifications, substitutions, omissions and additions may be made without departing from the scope of our invention as defined in the claims, for example by using a plurality of centrifugal rotors and filtrate guides in series to filter the oil in successive steps, and in other ways, such as employing a draft of inert gas in place of air, etc.

We claim:

1. The method of rectifying polluted oil which comprises diluting it with a volatile solvent, rapidly whirling the mixture in a body having an outer diameter several times its depth, against a prearranged, relatively shallow, annular dam of powdered material, centrifugally filtering the mixture through said dam, discharging it therefrom as a mist in a thin, flat sheet, continuously applying heat to the sheeted discharge and thereby progressively vaporizing the solvent therefrom, collecting the separated oil, conducting the solvent vapors into a condensing zone by the centrifugal impulse, and there condensing them.

2. An oil rectifier comprising the combination of a centrifugal filter and nebulizer constructed to discharge the filtrate as a mist in a thin sheet, and a vaporizer in receiving relation to the discharge of said filter.

3. An oil rectifier according to claim 37 in which the filter contains an annular porous dam of powdered material as the filtering element.

4. A rectifier for mixtures of heavy oil and solvent comprising a centrifugal filter and atomizer, an annular vaporizer surrounding the axis of rotation of said filter and having means for supplying artificial heat, means for conducting off the solvent vapors from said vaporizer, and an annular cooler for the separated hot oil, surrounding said axis in gravity receiving relation to said vaporizer.

5. An oil rectifier comprising a centrifuge including a filtering rotor, an annular filtrate-collecting baffle surrounding said rotor, and a conoidal film-forming vaporizer located below said baffle in filtrate-receiving relation thereto.

6. In a rectifier for a mixture of heavy oil and solvent, the combination of means for centrifugally filtering and atomizing the mixture as a vaporous spray, a condenser for receiving and liquefying the solvent vapors, a vaporizer adjacent said means and condenser for receiving the unvaporized portion of the spray and adapted to also deliver vapor to the condenser, a collecting and cooling vessel arranged in gravity receiving relation to said vaporizer, and means to prevent substantial contact of solvent vapors with the cooled oil surface in said vessel.

7. A rectifier according to claim 6 having means for creating an air current and passing it over the surface of the oil in the collecting and cooling vessel to prevent substantial contact therewith of the solvent vapors.

8. In an oil rectifier, the combination of an annular vaporizing plate adapted to deliver vapor from a film on its upper surface and undistilled liquid from its periphery, means for annularly feeding diluted oil to said plate, a fan under said plate, a purified-oil collector and cooler under said plate, means for directing an air current from said fan across the surface of the oil in said cooler and the liquid flow from said plate and upwardly to the vapor space of the vaporizer, a condenser for receiving the current of mixed air and vapor, and means below said condenser for collecting the condensate.

9. An oil rectifier comprising a mixer for polluted oil and solvent, a motor having a vertical shaft, a centrifugal filter in receiving relation to the mixer, carried by the upper end of said shaft, an air fan carried by said shaft, an annular vaporizer surrounding the motor for receiving the filtrate and having a vapor space above and surrounding said vaporizer, means for collecting and cooling undistilled oil from said vaporizer, and means for directing the fan current under the vaporizer and across the cooled oil and the liquid flow from said vaporizer into the vapor space of the latter.

ROBERT P. MOYER.
FREDELLIA HUGHES MOYER.